Dec. 9, 1969  E. G. ATTEBO  3,482,589
SIGNAL TRANSMITTING MEANS FOR A REGULATOR
Filed Jan. 19, 1968  2 Sheets-Sheet 1

United States Patent Office 3,482,589
Patented Dec. 9, 1969

3,482,589
SIGNAL TRANSMITTING MEANS FOR
A REGULATOR
Erik Gunnar Attebo, Säffle, Sweden, assignor to Aktiebolaget Kalle-Regulatorer, Säffle, Sweden, a corporation of Sweden
Filed Jan. 19, 1968, Ser. No. 699,180
Claims priority, application Sweden, Jan. 27, 1967,
1,216/67
Int. Cl. F15b 15/00
U.S. Cl. 137—85                                           7 Claims

ABSTRACT OF THE DISCLOSURE

In a regulator having a servo-cylinder operated by power amplifying means the signals from the measuring unit are transmitted to the amplifier by gas suction conduits which are continuously closed and opened by suction power operated valves in such a way that a pulse length modulated output is obtained.

BACKGROUND OF THE INVENTION

Field of the invention

The invention relates to regulators, especially to signal transmitting means for a regulator of the type in which a servo-cylinder is operated by power amplifying means controlled by varying pressure differences between two gas suction conduits. The inlets of said conduits are throttled by valves and one of these valves is controlled by signals from a measuring unit.

Description of the prior art

In electromechanic and electronic regulating systems it is known to operate the regulating unit by means of a regulator giving pulses of varying duration in dependence on the magnitude of the movement the regulating member has to perform to correct an actual error. A theoretical analysis of the function of these "3-point regulators" was for the first time made by R. C. Oldenbourg and H. Sartorius in a publication "Dynamik selbsttätiger Regelungen," Verlag R. Oldenbourg, Munich, 1951. In the last time the 3-point regulators have been given a pulse length modulated output and are thereby superior compared to continuous control systems of PID type.

However, electrical and electronic regulators have the disadvantage that the controlled variable must be transformed into an electric variable. The measuring unit required therefor as well as the regulator proper involve rather high expenses justifiable only for highly qualified regulating purposes. For these and other reasons, it has often been preferred to use simpler and cheaper control systems including pneumatically and/or hydraulically operating regulators.

SUMMARY OF THE INVENTION

The invention has for its object to provide signal transmitting means generally useful for regulators of the kind indicated above but primarily intended to be combined with a pneumatic/hydraulic regulator to give it a pulse length modulated output, whereby such a regulator obtains improved properties and thus may be used more extensively. According to the invention, each of said gas suction conduits is connected to a chamber through a branch conduit containing a check valve which opens from the chamber only. Each gas suction conduit has a flexible portion between its inlet end and said branch conduit, and said inlet end and its throttling valve element are mounted on members movable to and from each other. One of said movable members is acted upon by the signals from the measuring unit, while the other movable member constitutes a wall of pertaining chamber, said wall being movable inwardly against the action of resilient means. Further, each chamber communicates with the ambient atmosphere through a narrow leakage opening, whereby a throttling of one of said inlet valves results in a reduced pressure in pertaining chamber, so that the movable wall of such chamber is moved inwardly to open its valve. The valve thus opened is then again throttled, when its wall moves outwardly on supply of gas to the chamber through the leakage opening, and consequently a pulse length modulation is obtained.

Figure 1:
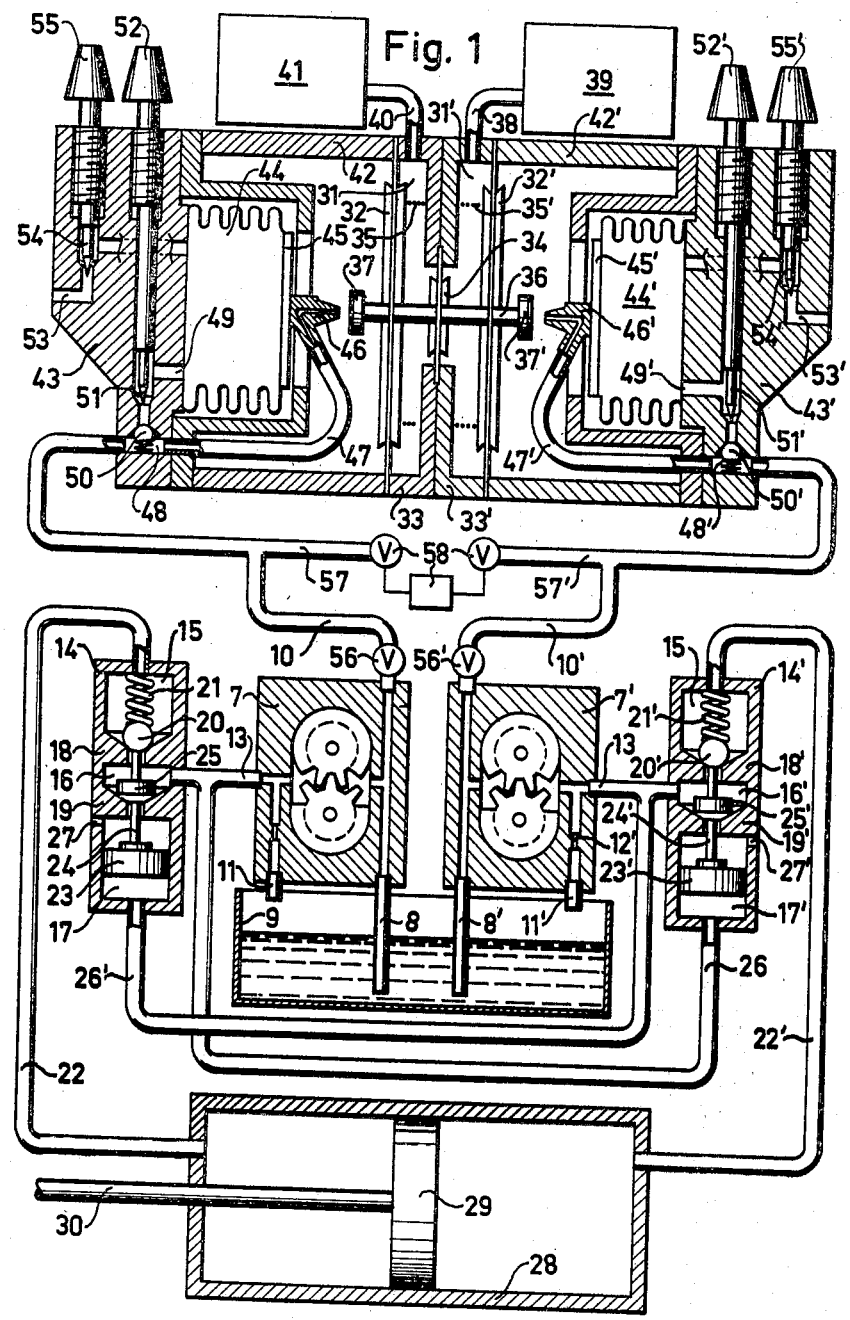
FIGURE 1 shows a vertical section through a regulator provided with signal transmitting means according to the invention.

The regulator which is of a 3-point type described in the pending application No. 654,903, now Patent No. 3,425,218 issued Feb. 4, 1969, includes two gear pumps serving as power amplifier or "booster." As will be described hereinafter, the pumps are provided with inlets for liquid and gas on the suction sides, and at its pressure side each pump has a restricted outlet as well as a pressure fluid conduit leading to a servo-cylinder with piston. The two gas inlets are controlled by the new signal transmitting device. The term "3-point regulator" is used to indicate that the piston of the servo-cylinder is either driven in one direction or the other or is locked in set position.

The two gear pumps 7 and 7' are adapted to be driven at the same speed by a motor, not shown. The pumps with pertaining valve means are identically alike and equally large so that only one of the devices need be described. Two pipes are connected to the suction side of the pump 7, viz. a downwardly directed pipe 8 dipping into an amount of oil contained in a vessel 9, and an upwardly directed air supply pipe 10, the inlet end of which cooperates with a valve mechanism pertaining to the signal transmitting device and described in more detail below. A downwardly directed pipe 11 containing a restriction 12, and a conduit 13 for supplying pressure fluid to a valve housing 14 extend from the pressure side of the pump 7.

The valve housing 14 contains three aligned chambers 15, 16 and 17 communicating through central openings formed by annular seat members 18, 19. The conduit 13 opens into the middle chamber 16. One end chamber 15 contains a ball 20 kept against the seat 18 by a spring 21 and thus serving as a valve member which shuts off the communication between the conduit 13 and a conduit 22 extending from the chamber 15. The other end chamber 17 is cylindrical and contains a movable piston 23 with a rod 24 which extends with clearance through the openings in the seat rings 18, 19 towards the ball 20. Within the middle chamber 16 the rod 24 carries a valve member 25. At overpressure in the conduit 13, said member 25 engages the seat ring 19 and interrupts the connection between the chambers 16 and 17. A conduit 26' extending from the pressure fluid conduit 13' of the other pump 7' opens into the portion of the cylinder chamber 17 located outside the piston 23, and on the opposite side of the piston the chamber 17 has an outlet opening 27.

The pressure fluid conduits 22 and 22' extend from the valve housing 14 and 14', respectively, to the opposite ends of a servo-cylinder 28. A movable piston 29 within said cylinder 28 has a rod 30 intended to be connected to a regulating member in the usual manner.

The signal transmitting means comprises two cooperating mechanisms which are identically alike but reversed in relation to each other. Two diaphragm chambers 31, 31' each confined by a diaphragm 32 and 32', respectively, and a cup-shaped member 33 and 33', respectively, are mounted coaxially with the bottoms of the cups in contact with each other, and a smaller, elastically resilient diaphragm 34 is disposed in a central opening through the bottom walls of the cups. The two larger diaphragms 32, 32' may be connected to said bottom walls by springs 35, 35'. Further, all three diaphragms are connected by means of an axial rod 36 carrying valve plates 37, 37' at its ends outside of the larger diaphragms 32, 32'. A conduit 38 connects one of the diaphragm chambers (the right one 31' in FIG. 1) to a reference instrument (indicated at 39) for adjustment of a predetermined pneumatic pressure, and another conduit 40 connects the diaphragm chamber 31 to a measuring unit or transducer 41 which converts the input into a pneumatic signal in some known manner.

As the two cooperating mechanisms are of the same design, only one of them need be described in detail.

Externally, the diaphragm chamber 31 is secured to a cylindrical casing 42 which has its outer end closed by a block 43 serving as lid. The inside of the block 43 forms the stationary end wall of a resilient bellows 44 movable to and from adjacent diaphragm 32. The inner end wall 45 of said bellows carries a nozzle 46 cooperating with an opposing valve plate 37. A hose 47 connects the nozzle 46 with a passageway 48 provided in the block 43. The other end of said passageway is connected to the above-mentioned air supply conduit 10 of the regulator.

A branch passage 49 extends from the passage 48 through the block 43 to the interior of the bellows 44. The branch passage 49 contains a check valve (spring-actuated ball 50) opening outwardly from the bellows and, further, it may be throttled by a needle valve 51 which may be adjusted from the outside by means of a knob 52. Also, the bellows 44 communicates with the ambient air by a leakage channel 53 which extends through the block 43. The channel 53 is throttled by a needle valve 54 which may be adjusted by a knob 55.

The air intake conduits 10, 10' may contain normally open cut-off valves 56 and 56', respectively, and conveniently branch conduits 57, 57' extend from the conduits 10, 10' to a normally closed double-valve 58 which on opening renders the regulator inactive.

The regulator described above operates in the following manner. In an initial position the pressures in the diaphragm chambers 31, 31' are assumed to be equal. Then the diaphragms 32, 32' have the positions shown in FIG. 1, and the air valves 37, 37' are open so that the pumps 7, 7' operate with air only. The piston 29 of the servo-cylinder is locked in its adjusted position, as the valves 20, 20' in the pressure fluid conduits 22, 22' are closed. Now, if an incoming signal produces an increase of the pressure in the diaphragm chamber 31, the diaphragms are moved to the left in FIG. 1. When the valve plate 37 gets sufficiently close to the opening of the nozzle 46, it is momentarily adhered and thus an underpressure is rapidly formed in the suction conduit 10. Thereupon the pump 7 sucks almost exclusively oil, and consequently the pressure in the conduit 13 and in the branch conduit 26 to the cylinder chamber 17' increases. The piston 23' is then moved inwardly so that the piston rod 24' raises the valve ball 20' from its seat 18'. The oil filling the right-hand chamber of the servo-cylinder 28 is thus free to escape through the outlet opening 27' above the piston 23'. When the pressure in the conduit 13 and in the valve chamber 16 has risen to such a value that it overcomes the force of the spring 21, the ball valve 20 is opened so that the oil under pressure flows through the conduit 22 to the left end of the servo-cylinder 28 and piston 29 is thus moved to the right.

The reduced pressure in the suction conduit 10 also causes the check valve 50 in the branch channel 49 to open so that the bellows 44 is evacuated and contracted to remove the nozzle 46 from the valve plate 37. The pressure in the suction conduit 10 then rapidly returns to its normal value, while the reduced pressure in the bellows 44 remains substantially unchanged, as the check valve 50 now blocks the communication to the suction conduit. However, gradually the pressure in the bellows returns to its normal value (atmospheric) owing to the leakage channel 53, and because of its inherent spring action the bellows returns to its initial position. If the set point has not yet been fully reached and thus the signal is retained, the valve 37 is closed once more and the process described is repeated.

Figure 2:
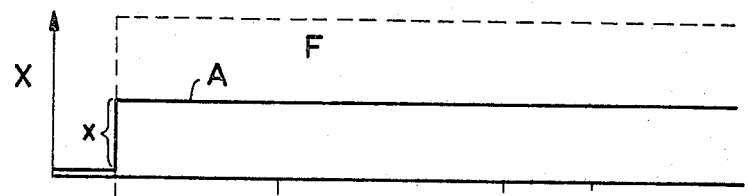
FIGURES 2–6 show diagrams serving to explain the functions of the regulator.
Figure 3:
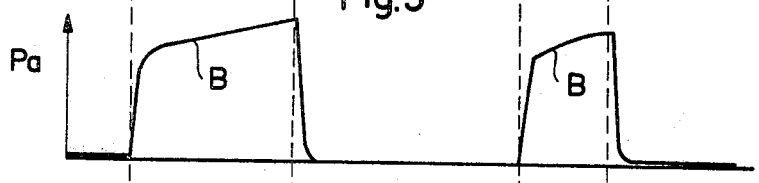

During the periods of time when the valve 37 is closed, the servo-piston 29 moves at constant speed to the right in FIG. 1, and the movement is instantly stopped when the valve 37 is again opened. The process may be studied in the diagrams shown in FIGS. 2-6, wherein the time is represented by the abscissae. In FIG. 2, the ordinate indicates the pressure difference X between the set point and the reference value or, in other words, the change of position of the valve plate 37. At the beginning of the process the pressure difference is 0 and at the moment $t_o$ it is increased to a certain value $x$ which, in this example, is assumed to remain constant (the curve A) as long as the error has not been remedied. Thus, at the moment $t_o$ the valve 37 is closed and an underpressure $P_a$ (the ordinate in FIG. 3) is rapidly formed in the suction conduit 10 (the curve B in FIG. 3). Consequently, the servo-piston 29 begins to move at constant speed, as shown by the curve C in FIG. 4, wherein the ordinate represents the movement Y of the piston. Simultaneously, the pressure in the bellows 44 drops. The pressure $-P_b$ and the movement Z of the bellows are indicated by the curves D and E in FIG. 5. When the movement of the bellows has become slightly greater than the pressure difference $x$ (FIG. 2), the air valve 37 releases the inlet of the nozzle 46, whereby the pressure in the suction conduit 10 increases rapidly and the piston 29 stops. This course has required the period of time $T_p$. During the following period of time $T_s$ the piston 29 remains immobile (the curved C in FIG. 4), the pressure $-P_b$ in the bellows returns slowly to atmospheric, and the movement of the bellows (the curve E) approaches 0. After the period $T_s$ the pressure of the bellows has dropped to a value slightly lower than $x$. Then the valve 37 is again closed, the underpressure in the suction conduit 10 increases rapidly, and the piston 29 continues to move at constant speed in the same direction as during the period of time $T_p$. The movement continues during the period $T_i$, whereupon Z has again increased to such a high value that the valve 37 is opened and the course during the period $T_s$ is repeated. The courses during the periods $T_i$ and $T_s$ are repeated continuously as long as the error remains.

The period $T_p$ may be varied by means of the needle valve (the knob 52). If the needle valve 51 is throttled, more time is needed for lowering the pressure $-P_b$ in the bellows to such a value that the valve 37 is opened, and then the piston will move a greater distance during its periods of movement. On the other hand, if the needle valve 51 is opened, the periods $T_p$ and $T_i$ become shorter. The length of the period $T_s$ may be influenced by adjustment of the needle valve 54 (the knob 55) in the leakage channel 53. If this valve 54 is throttled, more time is required until $-P_b$ has been changed to such a value that the air valve 37 is again closed.

Figure 4:
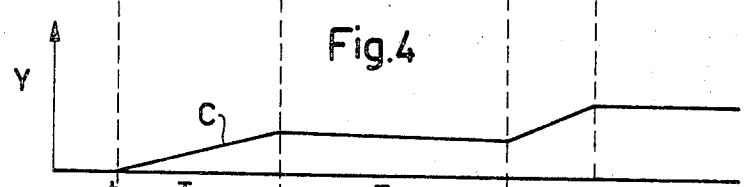
Figure 5:
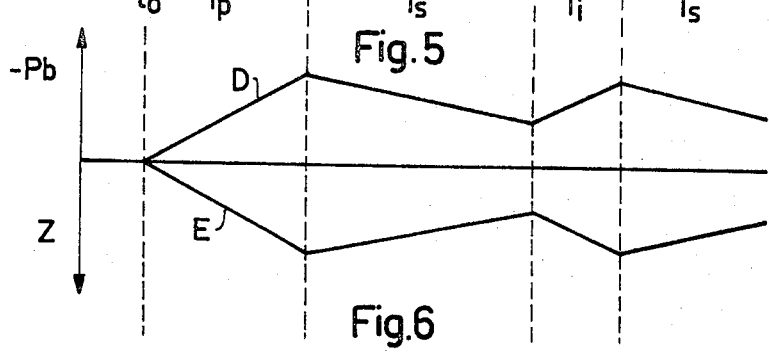
Figure 6:
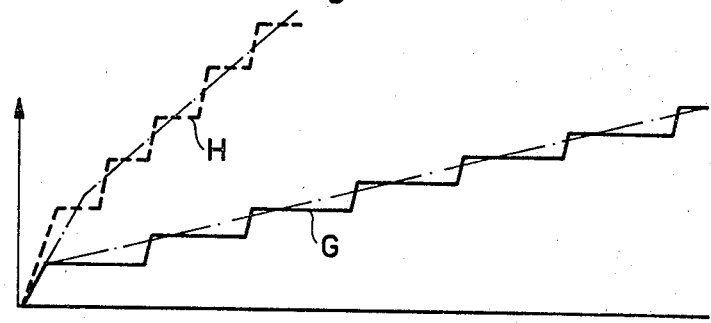

The courses are also influenced by the magnitude of the error to be adjusted. In FIG. 2, a greater error is indicated by a broken curve F. If the curve C in FIG. 4 is drawn on a shorter scale of time, the curve G in FIG. 6 is obtained whereas the curve H in FIG. 6 shows the position of the piston 29 as a function of the time at the error F. In practice, the processes to be controlled are generally so slow that the angularities of the curves G, H are not noticeable on the controlled variable, and therefore the curves may be replaced by the dash-and-dot lines in FIG. 6.

In contradistinction to a linear PI-regulator, a 3-point regulator operating with step response gives an I-time inversely proportionate to the error to be adjusted, and this circumstance, inter alia, is the reason why the 3-point regulators often give better results than linear regulators. Another basic advantage of the 3-point regulators is that it is easy to interfere manually in the regulating process and to make "impact-free" re-connections. If it is desired to break the control loop, it is only necessary to open the double valve 58 to make the regulator entirely inactive. Then the piston 29 may be set manually by closing either of the valves 56, 56'. The switch from automatic to manual operation is made without any impact, as the piston only stops in the position it occupied last. On the other hand, if a change is to be made from manual to automatic operation, it must first be checked that the reference value and the actual value are substantially consistent, whereupon the double valve 58 is closed so that the regulator is put into operation. If either of the valves 56, 56' is closed while the regulator is in operation, a proceeding pulse or output from the regulator will first be concluded, whereupon the function applied manually actuates the piston in the desired direction.

Although the functions of the signal transmitting device and the regulator have been described above only in connection with the operation of one of the pumps 7, it is evident that the other pump 7' and the details pertaining thereto function in a corresponding way on movement of the servo-piston 29 in the opposite direction, i.e. to the left in the drawing, and in such case the diaphragms 32, 32', 34 move to the right instead and thereby close the inlet of the nozzle 46'.

The invention is not limited to the embodiment described above. Thus, the two bellows 45, 45' may be replaced by diaphragm boxes, and bellows or possibly bourdon pipes may be substituted for the diaphragm chambers 31, 31'. Further, it is of course possible to let the valve plate 37 or 37' and its nozzle 46, 46' change places without changing the function in any way.

What I claim is:

1. Signal transmitting means for a regulator of the type in which a hydraulic servo-cylinder is operated by power amplifying means controlled by varying pressure differences between two gas suction conduits throttled by valves rigidly connected to each other and adjusted in opposite directions by forces constituting the difference between a reference value and signals from a measuring unit, said signal transmitting means being characterized in that each gas suction conduit is connected to a chamber through a branch conduit containing a check valve which opens from the chamber only, each gas suction conduit having a flexible portion between its inlet end and said branch conduit, said inlet end and its throttling valve element being mounted on members movable to and from each other, one of said movable members being acted upon by the signals from the measuring unit, while the other movable member constitutes a wall of its pertaining chamber, said wall being movable inwardly against the action of resilient means, each chamber communicating with the ambient atmosphere through a narrow leakage opening, whereby a throttling of one of said inlet valves results in a reduced pressure in the pertaining chamber, so that the movable wall of such chamber is moved inwardly to open its valve, the valve thus opened being then again throttled, when its wall moves outwardly on supply of gas to the chamber through the leakage opening, and consequently a pulse stroke modulation is obtained.

2. Signal transmitting means as claimed in claim 1, in which a manually adjustable valve is inserted in each of said branch conduits.

3. Signal transmitting means as claimed in claim 1, in which a manually adjustable valve is inserted in each of said leakage openings.

4. Signal transmitting means as claimed in claim 1, in which the movable walls of the chambers are turned to each other in spaced relationship, and the movable signal transmitting members are connected and placed between said movable walls in such a way that they keep both gas inlet valves open at the signal zero but are moved upon a deviation from the reference value to close the gas inlet valve which initiates the regulator to restore the set point.

5. Signal transmitting means as claimed in claim 4, in which the movable, signal transmitting members comprise pressure sensitive members arranged to be influenced by pressure signals and by an adjustable pressure corresponding to the reference value.

6. Signal transmitting means as claimed in claim 1, in which said gas suction conduits communicate with second branch conduits containing normally closed valves adapted, when opened, to render the regulator inactive.

7. Signal transmitting means as claimed in claim 6, in which normally open valves are provided in the gas suction conduits to make possible a manual operation of the regulator, when said normally closed valves in the second branch conduits have been opened.

References Cited

UNITED STATES PATENTS

| 2,942,581 | 6/1960 | Gaffney | 60—52 |
| 3,031,846 | 5/1962 | Weigand | 60—52 |

ALAN COHAN, Primary Examiner

U.S. Cl. X.R.

60—52; 103—6